United States Patent
Rutkiewicz et al.

(10) Patent No.: US 9,857,145 B1
(45) Date of Patent: Jan. 2, 2018

(54) TARGET-DESIGNATION DETECTION USED TO SHUTTER CAMERA IMAGES FOR LOCATING TARGET

(71) Applicant: Rosemount Aerospace Inc., Burnsville, MN (US)

(72) Inventors: Robert Rutkiewicz, Edina, MN (US); Gary Halama, Rosemount, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 54 days.

(21) Appl. No.: 15/195,594

(22) Filed: Jun. 28, 2016

(51) Int. Cl.
| | |
|---|---|
| *F41G 7/26* | (2006.01) |
| *H04N 5/33* | (2006.01) |
| *H04N 5/04* | (2006.01) |
| *F41G 7/00* | (2006.01) |

(52) U.S. Cl.
CPC ............... *F41G 7/26* (2013.01); *H04N 5/04* (2013.01); *H04N 5/33* (2013.01)

(58) Field of Classification Search
CPC ........ F41G 7/26; F41G 7/2266; F41G 7/2226; F41G 7/226; H04N 5/04; F42B 15/01; G06K 9/2036; G01S 17/10
See application file for complete search history.

(56) References Cited

U.S. PATENT DOCUMENTS

| | | | | |
|---|---|---|---|---|
| 3,743,216 A | * | 7/1973 | Salonimer | ............ F41G 7/2266 |
| 3,897,150 A | * | 7/1975 | Bridges et al. | ......... G01S 17/10 |
| 6,043,867 A | * | 3/2000 | Saban | ................... F41G 7/2226 |
| 6,111,241 A | * | 8/2000 | English et al. | ......... G01S 17/10 |
| 6,462,326 B1 | | 10/2002 | Cleaver | |
| 6,501,539 B2 | | 12/2002 | Chien et al. | |
| 6,987,256 B2 | * | 1/2006 | English et al. | ......... G01S 17/10 |
| 7,274,815 B1 | * | 9/2007 | Smithpeter et al. | . G06K 9/2036 |
| 7,626,460 B2 | | 12/2009 | Liu et al. | |
| 8,405,011 B2 | | 3/2013 | Sharpe | |
| 8,421,016 B2 | | 4/2013 | Audier | |

(Continued)

FOREIGN PATENT DOCUMENTS

| | | |
|---|---|---|
| EP | 2816309 A2 | 12/2014 |
| FR | 2912573 A1 | 8/2008 |
| WO | 2013108204 A1 | 7/2013 |

OTHER PUBLICATIONS

Extended European Search Report, for European Patent Application No. 17178508.2, dated Nov. 14, 2017, 10 pages.

*Primary Examiner* — Bernarr E Gregory
(74) *Attorney, Agent, or Firm* — Kinney & Lange, P.A.

(57) ABSTRACT

Apparatus and associated methods relate to a seeker for a Semi-Active Laser (SAL) guided missile. The seeker has a Short-Wave InfraRed (SWIR) camera and a Pulse Timing Logic (PTL) detector. The PTL detector has a SWIR photo detector axially aligned with a lens stack of the SWIR camera. The SWIR photo detector is configured to detect a sequence of SWIR pulses generated by a SAL target designator and reflected by a designated target. The PTL detector has a pulse timer configured to identify a sequence pattern of the detected sequence of SWIR pulses, and to predict a timing of a next SWIR pulse in the identified sequence pattern so as to synchronize exposure of the SWIR camera to capture a next image of the designated target at the predicted timing of the next SWIR pulse. Such exposure timing can advantageously improve the signal to noise ratio of the next image.

20 Claims, 9 Drawing Sheets

(56) References Cited

U.S. PATENT DOCUMENTS

| | | | |
|---|---|---|---|
| 8,587,776 | B2 | 11/2013 | Maryfield et al. |
| 8,809,787 | B2 | 8/2014 | Tidhar |
| 9,007,600 | B2 | 4/2015 | Imaki et al. |
| 2009/0078817 | A1* | 3/2009 | Williams ................ F42B 15/01 |
| 2012/0274947 | A1 | 11/2012 | Belhaire |
| 2014/0374533 | A1* | 12/2014 | Ell et al. ................ F42B 15/01 |
| 2015/0177381 | A1 | 6/2015 | Yap et al. |
| 2016/0116575 | A1 | 4/2016 | Dunne |
| 2017/0227329 | A1* | 8/2017 | Sackett ................... F41G 7/226 |

* cited by examiner

TARGET-DESIGNATION DETECTION USED TO SHUTTER CAMERA IMAGES FOR LOCATING TARGET

BACKGROUND

Semi-Active Laser (SAL) guided missile systems are used when destruction of a specific target requires precision. In some cases, such precision is needed to minimize collateral damage. In some cases, such precision is wanted to ensure that a high-value target is destroyed.

The principle of operation of SAL guided missile systems is to "paint" or designate a target with energy that is perceivable by a missile. In some cases, Short-Wave Infra-red Radiation (SWIR) is used in such target designation. A forward positioned soldier may direct a SWIR laser at a target desired to be eliminated.

A missile equipped with an SWIR quadrature detector then seeks a signature of the target being painted. When the SWIR quadrature detector acquires the signature of the SWIR energy illuminating the target, the missile guidance system directs the missile toward the painted target.

Some missiles are also equipped with camera systems. These camera systems, for example, have been used in missiles that have dual seeking modes. Missiles equipped with SWIR cameras, however, have not used images obtained from these systems for SAL designated target detection due to a relatively low signal to noise ratio of images.

SUMMARY

Apparatus and associated devices relate to a seeker for a seeker for a Semi-Active Laser (SAL) guided missile. The seeker includes a Short-Wave Infra-Red (SWIR) camera. The SWIR camera includes a focal plane array having an imaging region comprising a plurality of pixels. The SWIR camera includes an optical lens stack configured to receive SWIR light from a scene aligned along an optical axis of the optical lens stack. The optical lens stack is further configured to focus at least a portion of the received SWIR light onto the imaging region of the focal plane array thereby forming an image of the aligned scene. The image includes pixel intensity data generated by the plurality of pixels. The seeker includes a Pulse Timing Logic (PTL) detector. The PTL detector includes a SWIR photo detector aligned parallel to the optical axis so as to be operable to detect a sequence of SWIR pulses generated by a SAL target designator and reflected by the aligned scene. The PTL detector includes a pulse timer configured to identify a sequence pattern of the detected sequence of SWIR pulses. The pulse timer is further configured to predict a timing of a next SWIR pulse in the identified sequence pattern so as to synchronize the SWIR camera exposure to capture a next image of the aligned scene at the predicted timing of the next SWIR pulse.

Some embodiments relate to a method for guiding a missile to a Semi-Active Laser (SAL) designated target. The method includes detecting a sequence of Short-Wave Infra-Red (SWIR) pulses generated by a SAL target designator and reflected by a scene. The method includes identifying a sequence pattern of the detected sequence of SWIR pulses. The method includes predicting, based on the identified sequence pattern, a timing of a next SWIR pulse in the identified sequence pattern. The method includes synchronizing an SWIR camera exposure to the predicted timing of the next SWIR pulse. The method includes capturing an image of the scene at the predicted timing of the next SWIR pulse. The method also includes identifying, based on the captured image, a pixel location corresponding to a measure of a center of the next SWIR pulse.

DETAILED DESCRIPTION

Apparatus and associated methods relate to a seeker for a Semi-Active Laser (SAL) guided missile. The seeker has a Short-Wave InfraRed (SWIR) camera and a Pulse Timing Logic (PTL) detector. The PTL detector has a SWIR photo detector axially aligned with a lens stack of the SWIR camera. The SWIR photo detector is configured to detect a sequence of SWIR pulses generated by a SAL target designator and reflected by a designated target. The PTL detector has a pulse timer configured to identify a sequence pattern of the detected sequence of SWIR pulses, and to predict the timing of a next SWIR pulse in the identified sequence pattern so as to synchronize exposure of the SWIR camera to capture a next image of the designated target at the predicted timing of the next SWIR pulse. Such exposure timing can advantageously improve the signal to noise ratio of the next image.

Figure 1:
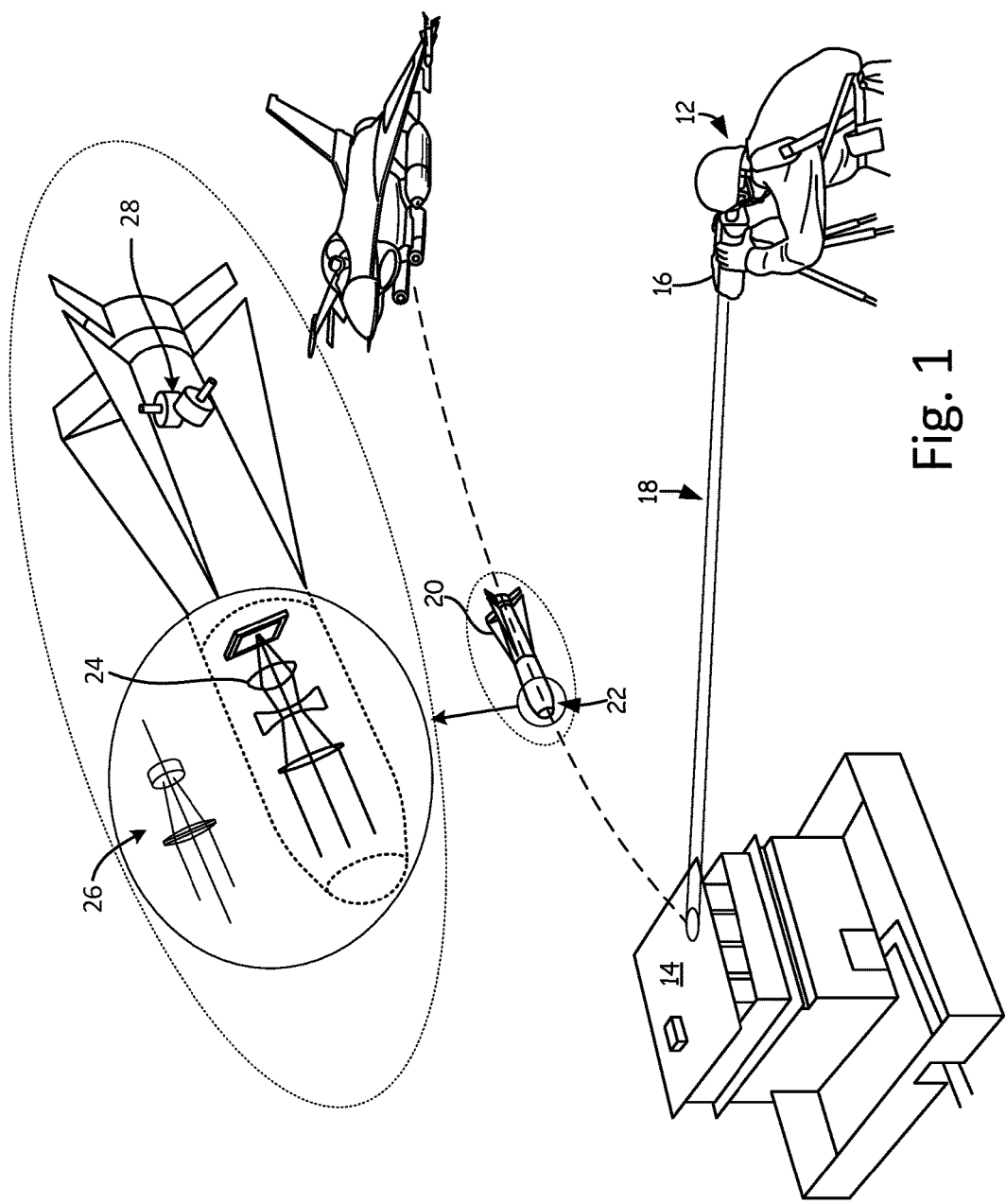
FIG. 1 is a schematic diagram of an exemplary scenario in which a precision guided weapon is equipped with a seeker that has a SWIR camera that has its exposure controlled by a PTL detector.

FIG. 1 is a schematic diagram of an exemplary scenario in which a precision guided weapon is equipped with a seeker that has a SWIR camera that has its exposure controlled by a PTL detector. In exemplary scenario 10, as depicted in FIG. 1, forward observer 12 is "painting" or illuminating designated target 14 using laser target designator (LTD) 16 to provide targeting signal 18 (e.g., laser radiation) that can be received by precision guided weapon 20. Precision guided weapon 20 can be launched, for example, from ground, sea, or air (as is depicted in FIG. 1). Precision guided weapon 20 has seeker 22, which guides precision guided weapon 20 to a location (e.g., designated target 14) from which targeting signal 18 reflects. Seeker 22 has SWIR camera 24 and PTL detector 26 which can interface with airfoil control system 28 of precision guided weapon 20.

In some embodiments, LTD 16 paints designated target 14 with electromagnetic energy that is invisible to the human eye. For example, a SWIR laser may designate target 14 as the terminal destination for precision guided weapon 20. In some embodiments, LTD 16 may designate target 14 using a pulsed and/or encoded pattern of illumination. PTL detector 26 detects the pulsed or encoded targeting signal 18 reflected by designated target 14. In some embodiments, PTL detector 26 uses a spectral light filter that corresponds to a spectrum of targeting signal 18 generated by LTD 16. PTL detector 26 can then identify the pattern sequence of detected targeting signal 18 to determine if targeting signal 18 originated from LTD 16. If PTL detector 26 identifies detected targeting signal 18 as originating from LTD 16 in this way, then PTL detector 26 can predict the timing of a next pulse in the encoded targeting signal 18.

SWIR camera 24 and PTL detector 26 operate in conjunction with airfoil control system 28 to provide closed-loop guidance control of precision guided weapon 20. Closed-loop guidance control includes a repetition of various steps. A first step involves PTL detector 26 detecting a sequence of SWIR pulses generated by LTD 16 and reflected by designated target 14. In this step, PTL detector 26 detects targeting signal 18, identifies a sequence pattern, determines if the identified sequence pattern corresponds to LTD 16, and predicts the future timing of a next pulse in the identified sequence of SWIR pulses.

A second step involves PTL detector 26 controlling a shuttering of SWIR camera 24 to capture an image of desired target 14. The shuttering of SWIR camera 24 is controlled such that desired target 14 is being illuminated by the next pulse generated by LTD 16 and therefore is captured in the next image created by SWIR camera 24. In this step, the captured image is used to locate a center of the laser designator signal corresponding to a terminal location of precision guided weapon 20.

A third step involves providing the center location of the laser designator signal to airfoil control system 28. In this step, airfoil control system 28 adjusts the physical orientation of one or more airfoils to aim the missile in the direction of the located center of the laser designator signal. In some embodiments, aiming the missile will simultaneously center the center of the laser designator signal within a field of view of SWIR camera 24 and/or PTL detector 26. In this way, aiming the missile closes the loop by centering the laser designator signal within the field of view of the PTL detector 26, which again detects the sequence of SWIR pulses.

In some embodiments, PTL detector 26 is oriented such that the SWIR energy detected by PTL detector 26 originates from a scene that is imaged by SWIR camera 24. In some embodiments, axially aligning PTL detector 26 parallel to a lens stack of SWIR camera 24 can result in a scene capable of being both imaged by SWIR camera 24 and detected by PTL detector 26. In some embodiments PTL detector 26 and SWIR camera 24 will both be axially aligned with precision guided weapon 20. In some embodiments, a gimbaled telescope assembly may permit PTL detector 26 and SWIR camera 24 to be pointed independently of an axis of precision guided weapon 20.

Figure 2:
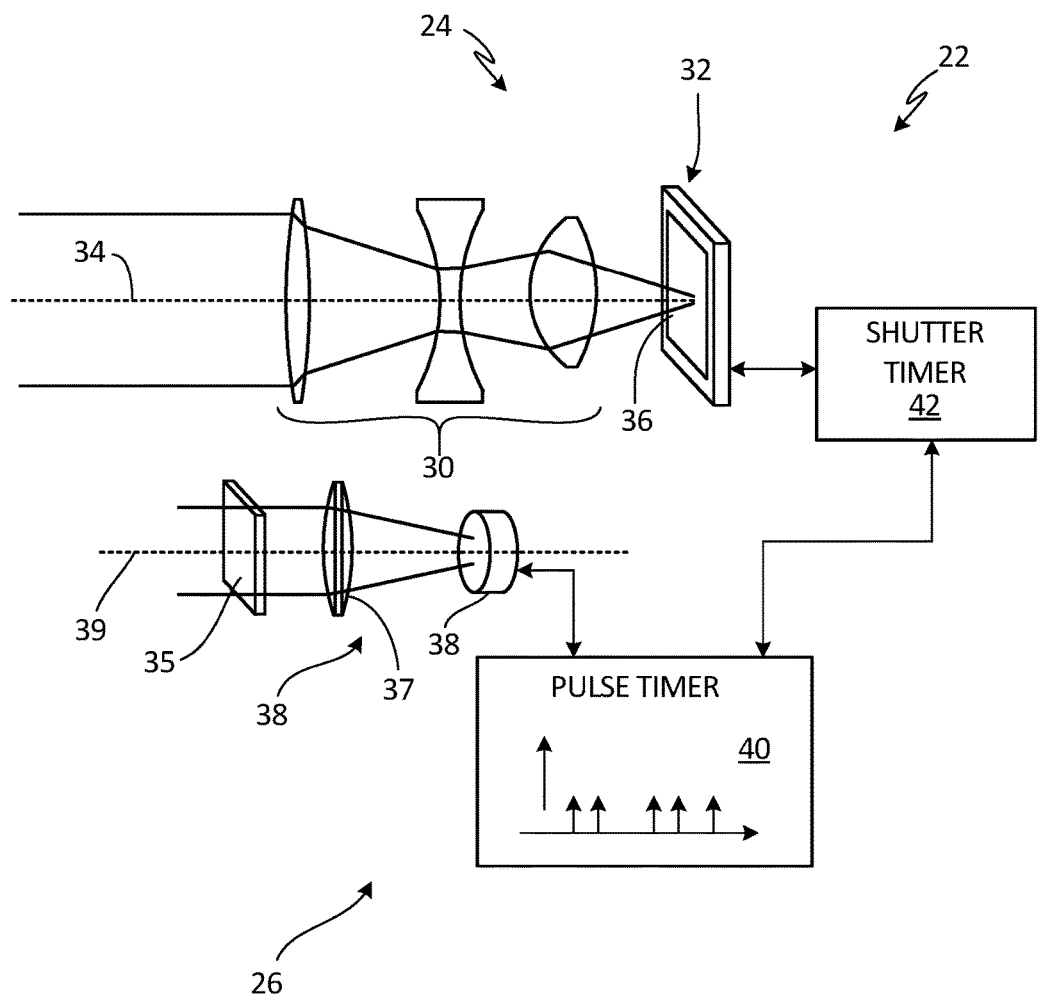
FIG. 2 is a schematic view of an exemplary seeker having SWIR shutter control by a PTL detector.

FIG. 2 is a schematic view of an exemplary seeker having SWIR shutter control by a PTL detector. In FIG. 2, seeker 22 has SWIR camera 24 and PTL detector 26. SWIR camera 24 has optical lens stack 30 and focal plane array 32. Optical lens stack 30 is configured to receive SWIR light from a scene aligned along optical axis 34 and is configured to focus at least a portion of the received SWIR light onto imaging region 36 of focal plane array 32.

PTL detector 26 includes light filter 35, SWIR collecting lens 37, SWIR photo detector 38 and pulse timer 40. In some embodiments, PTL detector 26 can have a bandpass optical filter to reduce the solar loading on the SWIR photodetector. SWIR collecting lens 37 and/or a center of the PTL photodetector can define optical axis 39 of PTL detector 26. Optical axis 39 of PTL detector 26 is aligned parallel to optical axis 34 of SWIR camera 24 so as to be able to detect a sequence of SWIR pulses generated by LTD 16 (shown in FIG. 1) and reflected by the scene aligned with SWIR camera 24. In some embodiments SWIR photo detector 38 is further configured to receive energy from a field of view that is substantially equal to a field of view imaged by SWIR camera 24. In this way, whenever SWIR photo detector 38 detects a sequence of SWIR pulses generated by LTD 16 and reflected by the scene, SWIR camera 24 can image that same scene designated by LTD 16. Imaging of the scene by SWIR camera 24 can be performed substantially simultaneously with detection of SWIR pulses by PTL detector 26.

Pulse timer 40 receives an output signal from SWIR photo detector 38. Pulse timer 40 then detects a sequence of SWIR pulses, based on the received output signal. Pulse timer 40 can compare the detected sequence of SWIR pulses with a predetermined pattern. If the detected sequence of SWIR pulses does not correspond to the predetermined pattern, the detected sequence of SWIR pulses is not used to predict a timing of the next pulse. If the detected sequence of SWIR pulses does correspond to the predetermined pattern, pulse timer 40 can predict a timing of the next pulse in the predetermined pattern. The predetermined pattern can correspond to the specific LTD 16 that is illuminating designated target 14. Pulse timer 40 generates an output signal indicative of the predicted timing of the next pulse.

SWIR camera 24 includes a shutter control module 42. Shutter control module 42 receives the output signal generated by pulse timer 40. Shutter control module controls the exposure and/or shutter timing of SWIR camera 24 such that an image is generated at the predicted timing of the next pulse in the detected sequence of SWIR pulses.

Various embodiments can use various methods to control exposure of images captured by SWIR camera 24. For example, in some embodiments, exposure can be controlled by a physical shutter. In other embodiments, exposure can be controlled electronically. Electronic control of exposure can sometimes be called electronic shutter control. Timing control of exposure can similarly be called shutter timing control.

In some embodiments, seeker 22 will also have a targeting module configured to determine a pixel location corresponding to a center of the next SWIR pulse as captured in an image taken by SWIR camera 26. The location of the center of the next SWIR pulse can be provided to airfoil control system 28. Airfoil control system 28 can compare the location of the center of the next SWIR pulse with the destination location of precision guided weapon 20 if left to continue on its current flight path.

Figure 3:
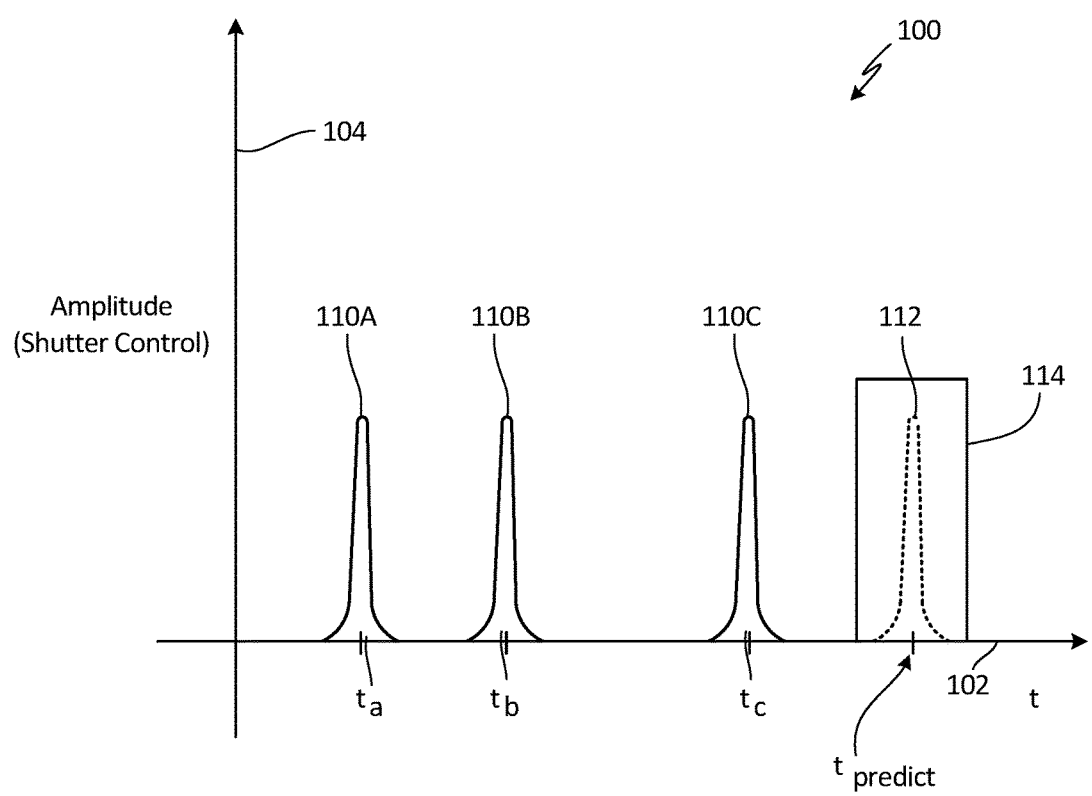
FIG. 3 depicts a graph of the timing of the detected sequence of SWIR pulses and the shutter control of a SWIR camera.

FIG. 3 depicts a graph of the timing of the detected sequence of SWIR pulses and the shutter control of a SWIR camera. In FIG. 3, graph 100 includes horizontal axis 102 and vertical axis 104. Horizontal axis 102 represents a time base, and vertical axis 104 is indicative of amplitude of detected SWIR pulses. Vertical axis 104 is also indicative of shutter control of SWIR camera 24. In graph 100, a sequence of pulses 110a, 110b, 110c, are depicted. Pulses 110a, 110b, and 110c occur centered at times $t_a$, $t_b$, $t_c$, respectively. The relative times $t_a$, $t_b$, $t_c$ may be indicative of a sequence pattern and/or code associated with LTD 16.

Pulse timer 40 can compare the times $t_a$, $t_b$, $t_c$, of detected pulses 110a, 110b, 110c, respectively, with a sequence pattern associated with LTD 16, for example. If the timing sequence of detected pulses 110a, 110b, 110c correspond to the sequence pattern associated with LTD 16, pulse timer 40 can identify the sequence pattern as originating from LTD 16. Pulse timer 40 then predicts a timing $t_{predict}$ of next pulse 112 in the identified sequence pattern. Pulse timer 40 can then inform SWIR camera of the predicted time $t_{predict}$ of next pulse.

Shutter control module 42 can then control exposure timing 114 such that the exposure includes the energy of predicted pulse 112. By narrowly including (overlapping minimally on either side of) predicted pulse 112, the exposure can maximize a ratio of received energy from the predicted pulse 112 generated by LTD 16 to energy originating from sources other than LTD 16. In some embodiments, SWIR camera may have a minimum exposure time that is longer than a pulse width of predicted next pulse 112. In such embodiments, a timing of the minimum exposure can be selected to include all of the predicted next pulse 112.

Figure 4:
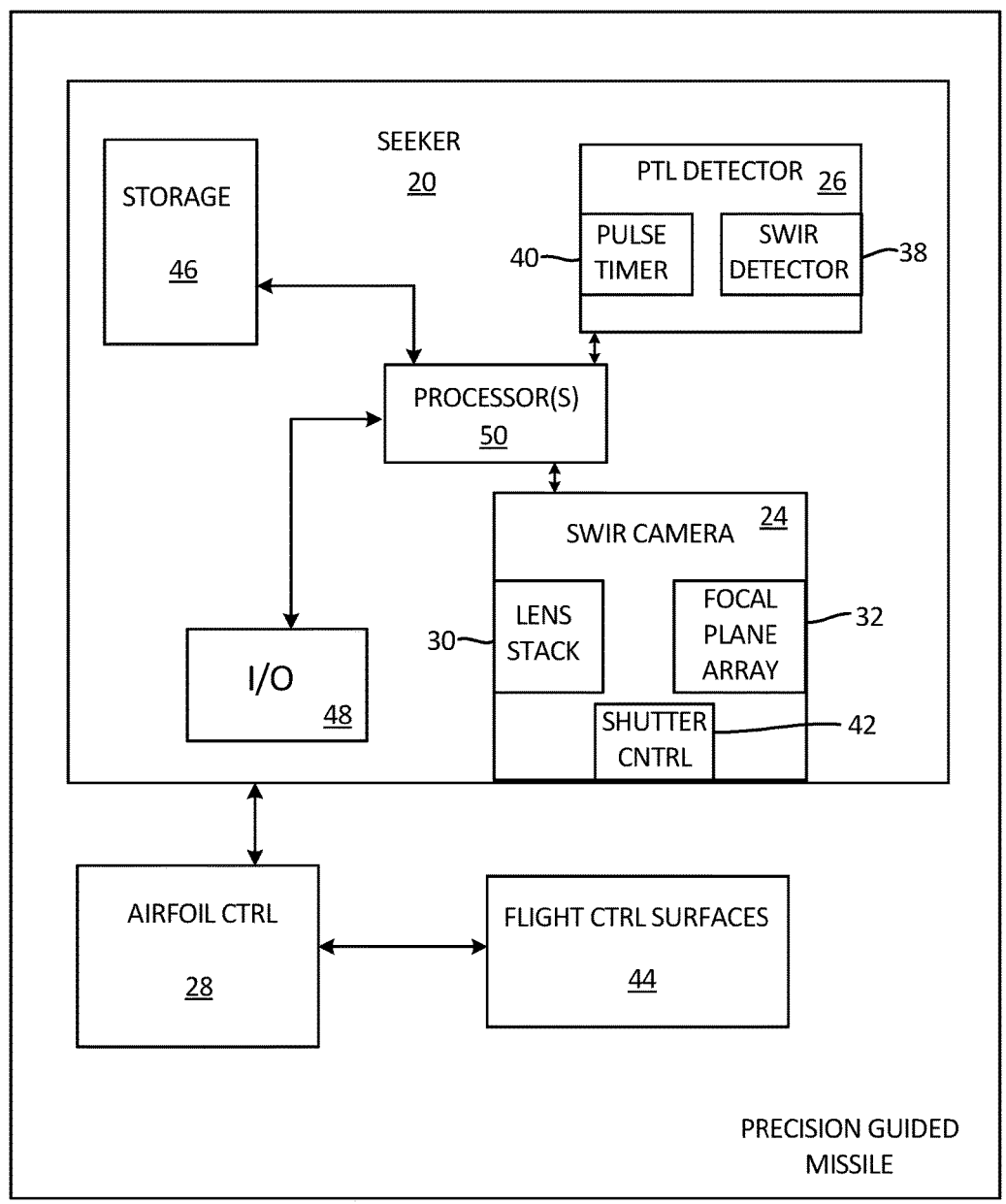
FIG. 4 is a block diagram of an exemplary seeker that provides shutter control of a SWIR camera based on a PTL detector predicting the timing of a next SWIR pulse.

FIG. 4 is a block diagram of an exemplary seeker that provides shutter control of a SWIR camera based on a PTL detector predicting the timing of a next SWIR pulse. In FIG. 4, precision guided weapon 20 includes seeker 22, airfoil control system 28, and flight control surfaces 44. Seeker 22 can be any device capable of executing computer-readable instructions defining a software program capable of locating a designated target from the vantage of precision guided missile 20. Examples of seeker 22 can include, but are not limited to, an avionics unit configured for use on a missile.

As illustrated in FIG. 4, seeker 22 includes SWIR camera 24, PTL detector 26, storage device(s) 46, input/output interface 48 and processor(s) 50. However, in certain examples, seeker 22 can include more or fewer components. Processor(s) 50, in one example, are configured to implement functionality and/or process instructions for execution within seeker 22. For instance, processor(s) 50 can be capable of processing instructions stored in storage device(s) 46. Examples of processor(s) 50 can include any one or more of a microprocessor, a controller, a digital signal processor (DSP), an application specific integrated circuit (ASIC), a field-programmable gate array (FPGA), or other equivalent discrete or integrated logic circuitry.

Processor(s) 50 interface with both SWIR camera 24 and PTL detector 26. In some embodiments, processor(s) 50 may perform some or all of the operations associated with pulse timer 40. Such operations may include detection of a sequence of pulses from a signal generated by SWIR detector 38, identifying a sequence pattern in the detected sequence of pulses, associating the identified sequence with LTD 16, and predicting the timing of a next pulse in the identified sequence. Processor(s) 50 may perform shutter timing control, based on the predicted timing of the next pulse, of SWIR camera 24, in some embodiments. In some embodiments, processor(s) 50 may perform image processing algorithms on images generated by focal plane array 32. For example, processor(s) 50 may identify a pixel location of a measure of a center of a SWIR pulse imaged by focal plane array 32.

Various embodiments can use various measures of the center of the SWIR pulse imaged by the focal plane array. For example, in some embodiments, a pixel datum that has the highest amplitude and/or intensity value may be selected as the center of the SWIR pulse. In some embodiments, a weighted centroid may be determined from the intensities of many pixels. In some embodiments a convolving algorithm may be used to generate a filtered version of the image. A pixel location corresponding to a maximum value of the convolved image may be selected as the center of the SWIR pulse in the image.

Storage device(s) 46 can be configured to store information within seeker 22 during operation. Storage device(s) 46, in some examples, are described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 46 are a temporary memory, meaning that a primary purpose of storage device(s) 46 is not long-term storage. Storage device(s) 46, in some examples, are described as volatile memory, meaning that storage device(s) 46 do not maintain stored contents when power to seeker 22 is turned off. Examples of volatile memories can include random access memories (RAM), dynamic random access memories (DRAM), static random access memories (SRAM), and other forms of volatile memories. In some examples, storage device(s) 46 are used to store program instructions for execution by processor(s) 50. Storage device(s) 46, in one example, are used by software or applications running on seeker 22 (e.g., a software program implementing designated target detection) to temporarily store information during program execution.

Storage device(s) 46, in some examples, also include one or more computer-readable storage media. Storage device(s) 46 can be configured to store larger amounts of information than volatile memory. Storage device(s) 46 can further be configured for long-term storage of information. In some examples, storage device(s) 46 include non-volatile storage elements. Examples of such non-volatile storage elements can include magnetic hard discs, optical discs, flash memories, or forms of electrically programmable memories (EPROM) or electrically erasable and programmable (EEPROM) memories. Storage device(s) 46 can include program segments, pulse detector segments, pattern sequence recognition segments, and image processing segments, etc.

Seeker 22 also includes input/output interface 48. In some embodiments, input/output interface 48 can utilize communications modules to communicate with external devices via one or more networks, such as one or more wireless or wired networks or both. Input/Output interface 48 can be a network interface card, such as an Ethernet card, an optical transceiver, a radio frequency transceiver, or any other type of device that can send and receive information. Other examples of such network interfaces can include Bluetooth, 3G, 4G, and WiFi radio computing devices as well as Universal Serial Bus (USB).

Figure 5:
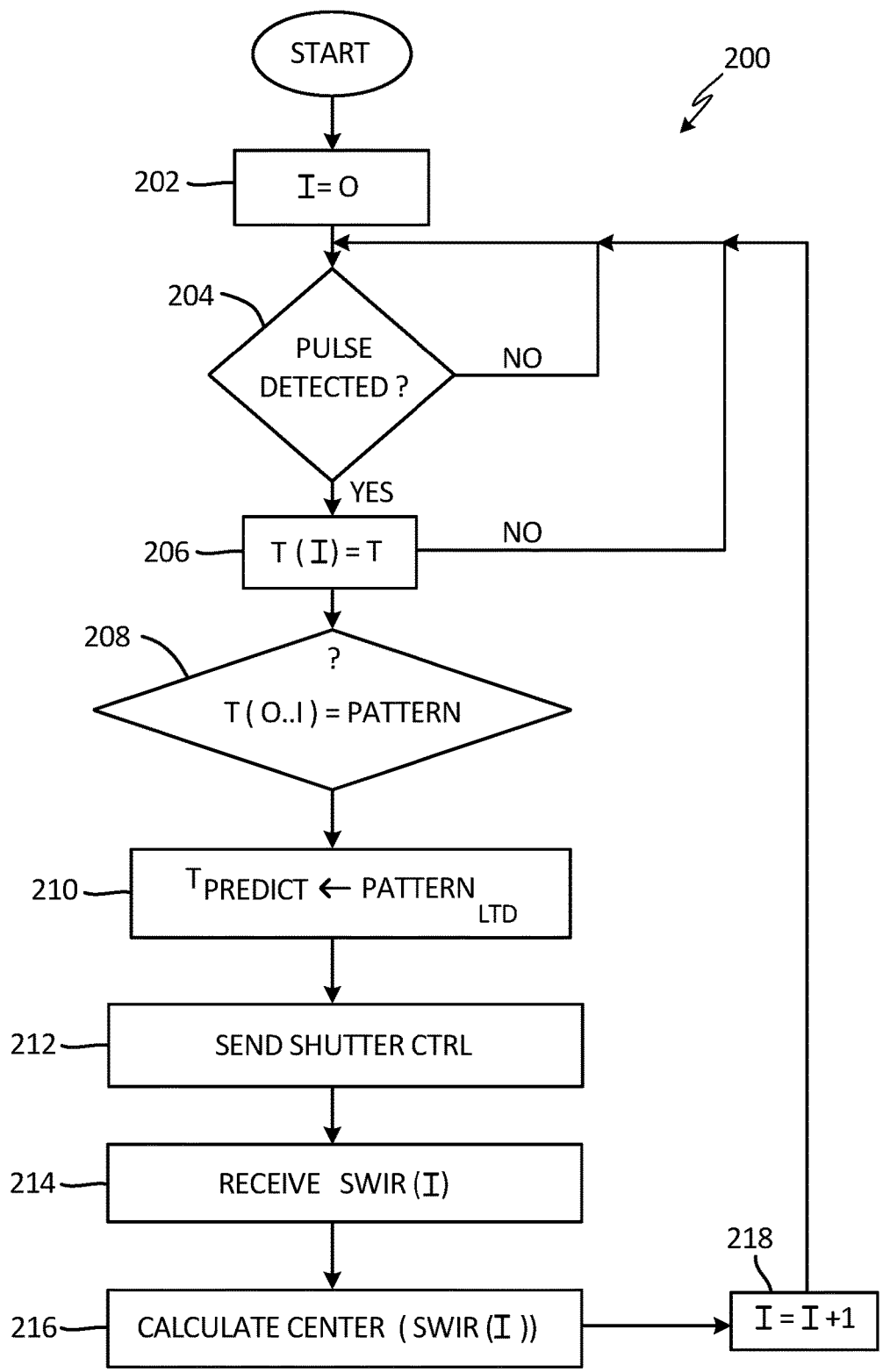
FIG. 5 is a flowchart of an exemplary method for guiding a missile to a Semi-Active Laser (SAL) designated target.

FIG. 5 is a flowchart of an exemplary method for guiding a missile to a Semi-Active Laser (SAL) designated target. In FIG. 5, method 200 is depicted from the vantage point of processor(s) 50 of FIG. 4. Method 200 begins at step 202 where processor(s) 50 initializes index I. Each detected pulse in a sequence of SWIR pulses can be associated with a unique value of index I. Then method 200 proceeds to step 204, where processor(s) 50 waits for detection of a next pulse. Method 200 remains at step 204 until a next pulse is detected. When the next pulse is detected, method 200 proceeds to step 206, where processor(s) 50 save the time T(I) at which the pulse was detected. Then, method 200 proceeds to step 208, where processor(s) 50 compare a sequence timing T(0 . . . I) with a predetermined sequence pattern $PATTERN_{LTD}$ associated with LTD 16. If, at step 208, the sequence timing T(0 . . . I) is not correlated with predetermined pattern $PATTERN_{LTD}$, then method 200 returns to step 204 without incrementing index I. If, however, at step 208, the sequence timing T(0 . . . I) is correlated with predetermined pattern $PATTERN_{LTD}$, then method 200 proceeds to step 210, where processor(s) selects a timing of a next pulse in correlated predetermined pattern PATTERN- $_{LTD}$. Then, method 200 proceeds to step 212, where processor(s) 50 sends a shutter control signal to SWIR camera 24. Then, at step 214, processor(s) 50 receives image SWIR(I) from SWIR camera 24. Then, at step 216, processor(s) 50 calculates a center of a target designator pulse within received image SWIR(I). Method 200 then proceeds to step 218, where processor(s) 50 increments index I. Method 200 then returns to step 204 and awaits detection of a next pulse.

Figure 6A:
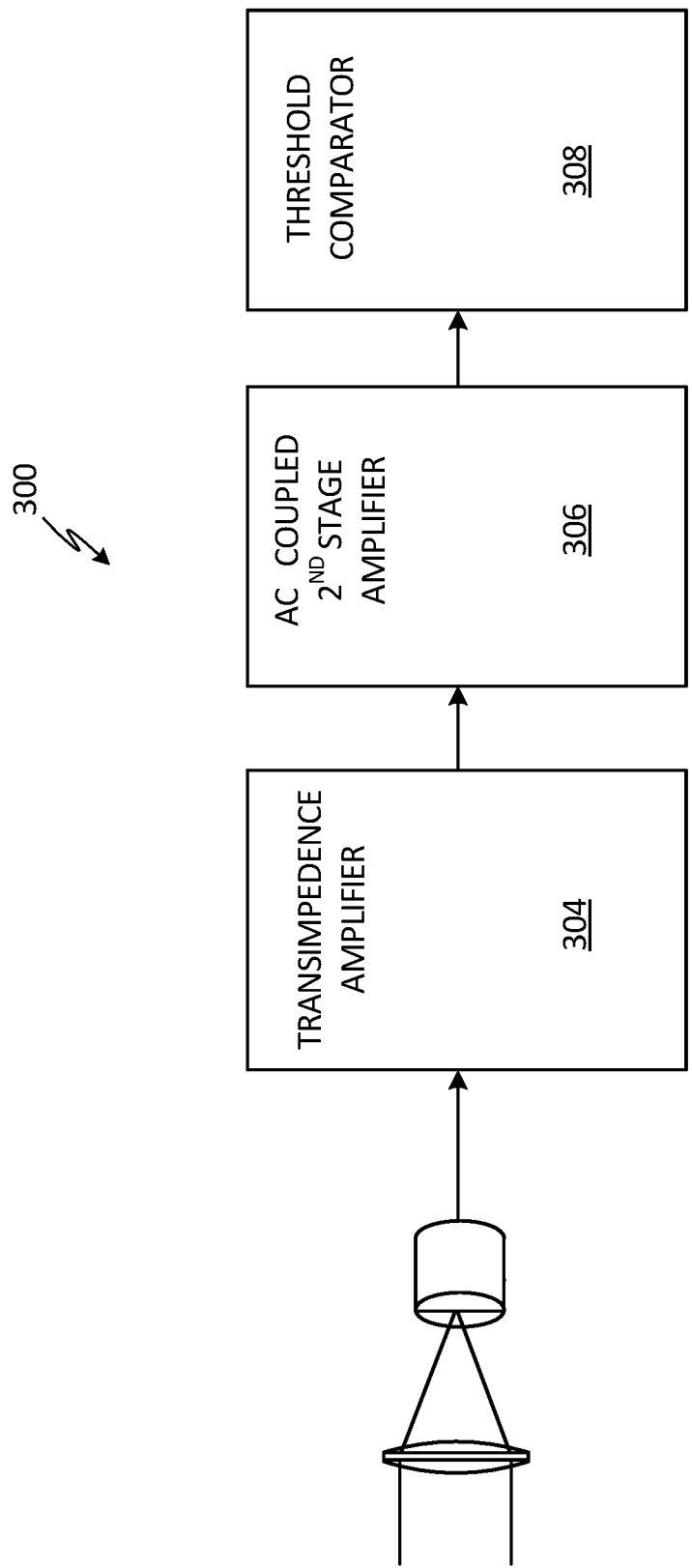
FIGS. 6A-6D are schematic diagrams of an exemplary PTL detector circuit.
Figure 6B:
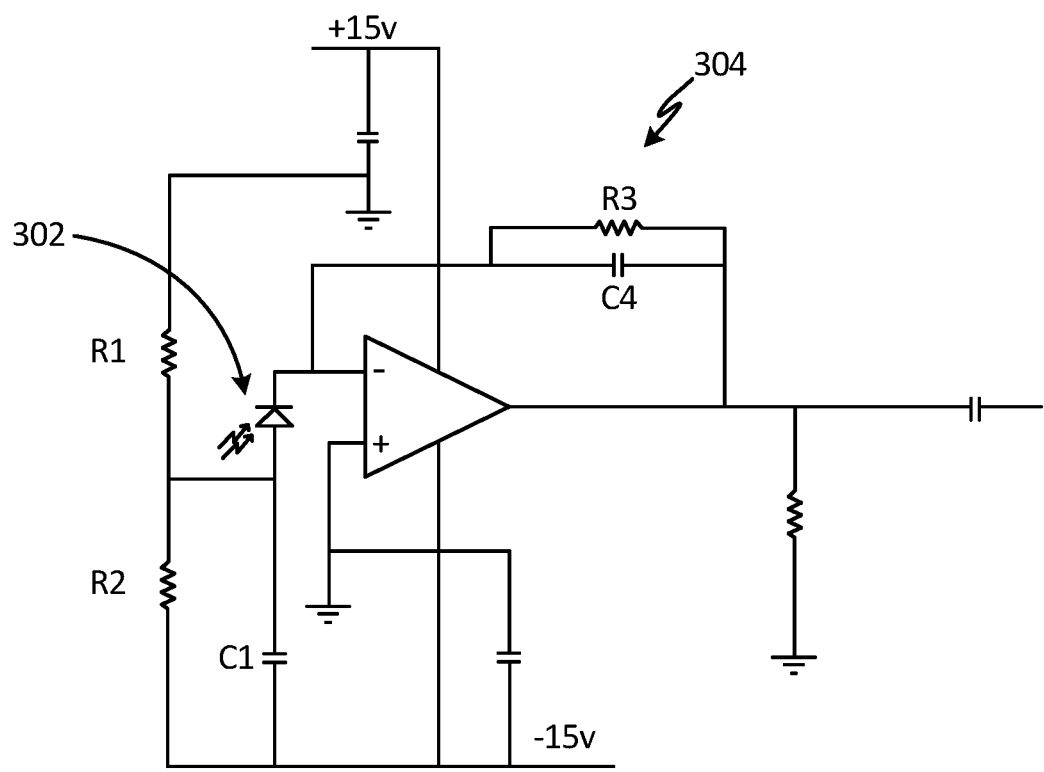

FIGS. 6A-6D are schematic diagrams of an exemplary PTL detector circuit. In FIG. 6A, PTL detector circuit 300 includes SWIR photo detector 302, transimpedence amplifier 304, AC coupled second stage amplifier 306, and threshold comparator 308. FIG. 6B is a more details schematic of SWIR photo detector 302 and transimpedence amplifier 304. In FIG. 6B, SWIR photo detector 302 is biased by resistors R1, R2 and capacitor C1. Current in and/or voltage across photo detector 302 is modulated by SWIR energy incident thereon. Transimpedence amplifier 304 has negative feedback stability through feedback elements resistor R3 and capacitor C4. An output from transimpedence amplifier 304 will be a buffered representation of the modulated current in or voltage across SWIR photo detector 302.

Figure 6C:
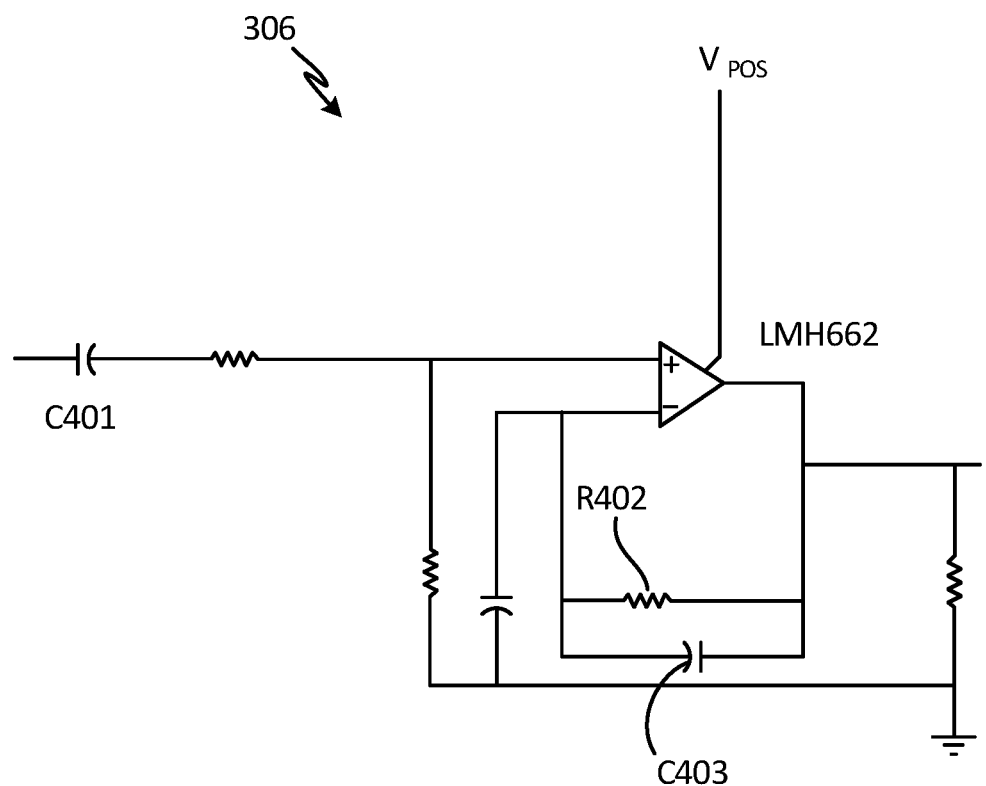

In FIG. 6C, AC coupled second stage amplifier 306 includes AC coupling capacitor C401 electrically connected to positive input terminal of operational amplifier LMH6642. The output signal from transimpedence amplifier 304 is electrically coupled to the input signal of AC coupled second stage amplifier 306. Operational amplifier LMH6642 is configured with negative feedback via resistor R402 and capacitor C403. The AC coupling configuration ensures that only high-frequency content of an input signal will be included in an output signal from AC coupled second stage amplifier 306.

Figure 6D:
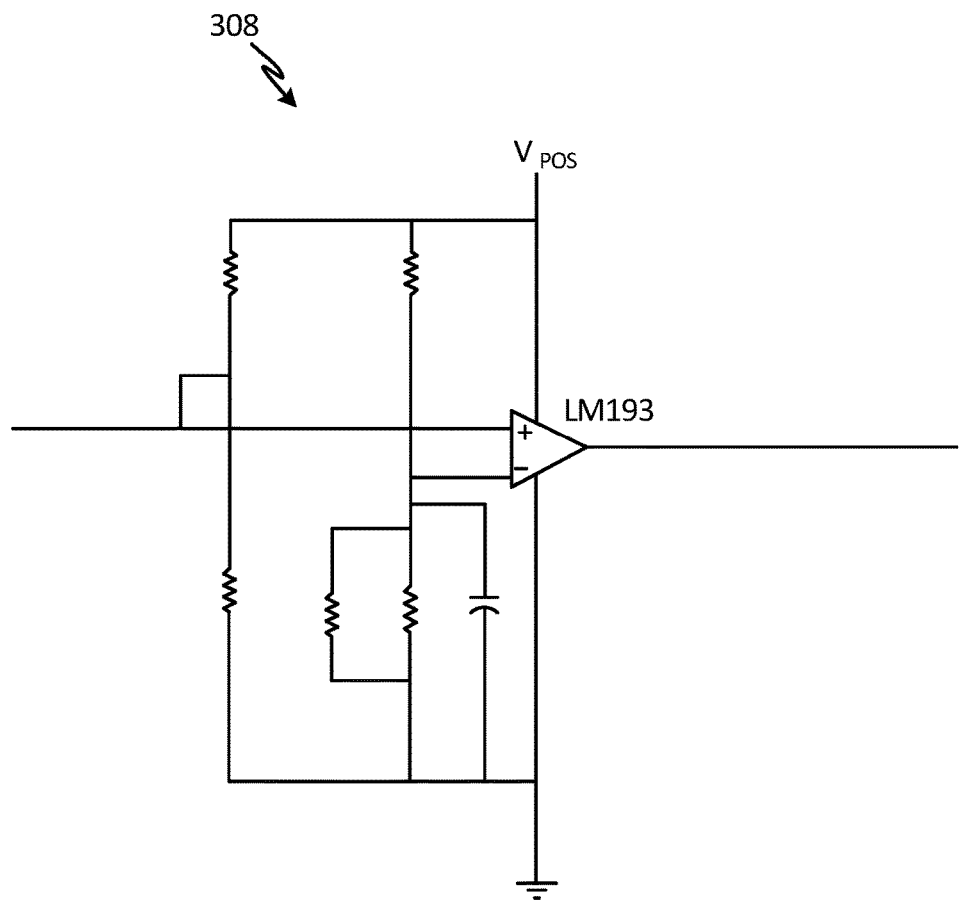

In FIG. 6D, threshold comparator 308 compares an input signal with a reference signal. The output signal of AC coupled second stage amplifier 306 is electrically coupled to the input signal of threshold comparator 308. The input signal is electrically coupled to a positive input terminal of comparator LM193. A reference signal is electrically coupled to a negative input terminal of comparator LM193. Whenever the input signal is greater than the reference signal, comparator LM193 will generate a high voltage. Whenever the input signal is less than the reference signal, comparator LM193 will generate a low voltage.

The following are non-exclusive descriptions of possible embodiments of the present invention.

A seeker for a Semi-Active Laser (SAL) guided missile includes a Short-Wave Infra-Red (SWIR) camera. The SWIR camera includes a focal plane array having an imaging region comprising a plurality of pixels. The SWIR camera includes an optical lens stack configured to receive SWIR light from a scene aligned along an optical axis of the optical lens stack. The optical lens stack is further configured to focus at least a portion of the received SWIR light onto the imaging region of the focal plane array thereby forming an image of the aligned scene. The image includes pixel intensity data generated by the plurality of pixels. The seeker includes a Pulse Timing Logic (PTL) detector. The PTL detector includes a SWIR photo detector aligned parallel to the optical axis so as to be operable to detect a sequence of SWIR pulses generated by a SAL target designator and reflected by the aligned scene. The PTL detector includes a pulse timer configured to identify a sequence pattern of the detected sequence of SWIR pulses. The pulse timer is further configured to predict a timing of a next SWIR pulse in the identified sequence pattern so as to synchronize the SWIR camera exposure to capture a next image of the aligned scene at the predicted timing of the next SWIR pulse.

The seeker of the preceding paragraph can optionally include, additionally and/or alternatively, any one or more of the following features, configurations and/or additional components: a targeting module configured to identify, based on the captured next image, a pixel location corresponding to a measure of a center of the next SWIR pulse.

A further embodiment of the foregoing seekers, wherein the pixel location corresponding to the measure of the center of the next SWIR pulse can be the pixel location corresponding to a one of the plurality of pixels that has the largest pixel intensity datum.

A further embodiment of any of the foregoing seekers, wherein the pixel location of the measure of the center of the next SWIR pulse can be identified by calculating a centroid of the pixel intensity data of the plurality of pixels. A further embodiment of any of the foregoing seekers, wherein the PTL detector further can include an optical filter and a collecting lens. A further embodiment of any of the foregoing seekers, wherein the pulse timer can synchronize the SWIR camera exposure by selecting a minimum-duration shutter timing that includes the predicted timing of the next SWIR pulse. A further embodiment of any of the foregoing seekers, wherein the pulse timer can synchronizes the SWIR camera exposure by selecting a shutter timing that maximizes a ratio of an energy imaged from the next SWIR pulse generated by the SAL target designator to SWIR energy generated by other sources. A further embodiment of any of the foregoing seekers, wherein an extent of the aligned image can define a first field of view of the SWIR camera. A second field of view of the SWIR photo detector can be substantially equal to the first field of view. A further embodiment of any of the foregoing seekers, wherein the SWIR photo detector can be further configured to sum all received SWIR energy within the second field of view to detect the sequence of SWIR pulses. A further embodiment of any of the foregoing seekers, wherein the PTL detector can further include a transimpedence amplifier electrically coupled to the SWIR photo detector. The transimpedence amplifier can be configured to amplify a signal output from the SWIR photo detector. A further embodiment of any of the foregoing seekers, wherein the PTL detector can further include a thresholding circuit AC coupled to the transimpedence amplifier. The thresholding circuit can be configured to compare a high-pass filtered version of the signal output from the SWIR photo detector with a predetermined threshold to identify individual pulses of the received sequence of SWIR pulses.

A method for guiding a missile to a Semi-Active Laser (SAL) designated target includes detecting a sequence of Short-Wave Infra-Red (SWIR) pulses generated by a SAL target designator and reflected by a scene. The method includes identifying a sequence pattern of the detected sequence of SWIR pulses. The method includes predicting, based on the identified sequence pattern, a timing of a next SWIR pulse in the identified sequence pattern. The method includes synchronizing an SWIR camera exposure to the predicted timing of the next SWIR pulse. The method includes capturing an image of the scene at the predicted timing of the next SWIR pulse. The method also includes identifying, based on the captured image, a pixel location corresponding to a measure of a center of the next SWIR pulse.

A further embodiment of the foregoing method, wherein identifying a pixel location corresponding to a measure of a center of the next SWIR pulse can include selecting the pixel location of a one of a plurality of pixels that has a largest pixel intensity datum. A further embodiment of any of the foregoing methods, wherein identifying a pixel location corresponding to a measure of a center of the next SWIR pulse can include calculating a centroid of pixel intensity data of a plurality of pixels. A further embodiment of the foregoing method, wherein synchronizing the SWIR camera exposure to the predicted timing of the next SWIR pulse can include selecting a minimum-duration shutter timing that includes the predicted timing of the next SWIR pulse. A further embodiment of the foregoing method, wherein synchronizing the SWIR camera exposure to the predicted timing of the next SWIR pulse can include selecting a shutter timing that maximizes a ratio of the energy imaged from the next SWIR pulse generated by the SAL target designator to SWIR energy generated by other sources. A further embodiment of the foregoing method, wherein synchronizing the SWIR camera exposure to the predicted timing of the next SWIR pulse can include selecting a shutter timing in which the predicted timing of the next SWIR pulse generated by the SAL target designator occurs wholly within the selected shutter timing. A further embodiment of the foregoing method, wherein detecting a sequence of SWIR pulses can include: detecting SWIR energy over a field of view; and spatially summing the detected SWIR energy over the field of view. A further embodiment of the foregoing method, wherein detecting a sequence of SWIR pulses can include amplifying an output signal from a SWIR photo detector. A further embodiment of the foregoing method, wherein detecting a sequence of SWIR pulses further can include: AC coupling the amplified output signal; and comparing the AC coupled signal with a predetermined threshold.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A seeker for a Semi-Active Laser (SAL) guided missile, the seeker comprising:
   a Short-Wave Infra-Red (SWIR) camera comprising:
      a focal plane array having an imaging region comprising a plurality of pixels; and
      an optical lens stack configured to receive SWIR light from a scene aligned along an optical axis of the optical lens stack and further configured to focus at least a portion of the received SWIR light onto the imaging region of the focal plane array thereby forming an image of the aligned scene, the image comprising pixel intensity data generated by the plurality of pixels; and
   a Pulse Timing Logic (PTL) detector comprising:
      a SWIR photo detector aligned parallel to the optical axis so as to be operable to detect a sequence of SWIR pulses generated by a SAL target designator and reflected by the aligned scene; and
      a pulse timer configured to identify a sequence pattern of the detected sequence of SWIR pulses, and further configured to predict a timing of a next SWIR pulse in the identified sequence pattern so as to synchronize the SWIR camera exposure to capture a next image of the aligned scene at the predicted timing of the next SWIR pulse.

2. The seeker of claim 1, further comprising:
   a targeting module configured to identify, based on the captured next image, a pixel location corresponding to a measure of a center of the next SWIR pulse.

3. The seeker of claim 2, wherein the pixel location corresponding to the measure of the center of the next SWIR pulse is the pixel location corresponding to a one of the plurality of pixels that has the largest pixel intensity datum.

4. The seeker of claim 2, wherein the pixel location of the measure of the center of the next SWIR pulse is identified by calculating a centroid of the pixel intensity data of the plurality of pixels.

5. The seeker of claim 1, wherein the PTL detector further comprises:
   an optical filter; and
   a collecting lens.

6. The seeker of claim 1, wherein the pulse timer synchronizes the SWIR camera exposure by selecting a minimum-duration shutter timing that includes the predicted timing of the next SWIR pulse.

7. The seeker of claim 1, wherein the pulse timer synchronizes the SWIR camera exposure by selecting a shutter timing that maximizes a ratio of an energy imaged from the next SWIR pulse generated by the SAL target designator to SWIR energy generated by other sources.

8. The seeker of claim 1, wherein an extent of the aligned image defines a first field of view of the SWIR camera, wherein a second field of view of the SWIR photo detector is substantally equal to the first field of view.

9. The seeker of claim 8, wherein the SWIR photo detector is further configured to sum all received SWIR energy within the second field of view to detect the sequence of SWIR pulses.

10. The seeker of claim 1, wherein the PTL detector further comprises:
    a transimpedence amplifier electrically coupled to the SWIR photo detector, the transimpedence amplifier configured to amplify a signal output from the SWIR photo detector.

11. The seeker of claim 10, wherein the PTL detector further comprises:
    a thresholding circuit AC coupled to the transimpedence amplifier, the thresholding circuit configured to compare a high-pass filtered version of the signal output from the SWIR photo detector with a predetermined threshold to identify individual pulses of the received sequence of SWIR pulses.

12. A method for guiding a missile to a Semi-Active Laser (SAL) designated target, the method comprising:
    detecting a sequence of Short-Wave Infra-Red (SWIR) pulses generated by a SAL target designator and reflected by a scene;
    identifying a sequence pattern of the detected sequence of SWIR pulses;
    predicting, based on the identified sequence pattern, a timing of a next SWIR pulse in the identified sequence pattern;
    synchronizing an SWIR camera exposure to the predicted timing of the next SWIR pulse;
    capturing an image of the scene at the predicted timing of the next SWIR pulse; and identifying, based on the captured image, a pixel location corresponding to a measure of a center of the next SWIR pulse.

13. The method of claim 12, wherein identifying a pixel location corresponding to a measure of a center of the next SWIR pulse comprises:

selecting the pixel location of a one of a plurality of pixels that has a largest pixel intensity datum.

14. The method of claim 12, wherein identifying a pixel location corresponding to a measure of a center of the next SWIR pulse comprises:

calculating a centroid of pixel intensity data of a plurality of pixels.

15. The method of claim 12, wherein synchronizing the SWIR camera exposure to the predicted timing of the next SWIR pulse comprises:

selecting a minimum-duration shutter timing that includes the predicted timing of the next SWIR pulse.

16. The method of claim 12, wherein synchronizing the SWIR camera exposure to the predicted timing of the next SWIR pulse comprises:

selecting a shutter timing that maximizes a ratio of the energy imaged from the next SWIR pulse generated by the SAL target designator to SWIR energy generated by other sources.

17. The method of claim 12, wherein synchronizing the SWIR camera exposure to the predicted timing of the next SWIR pulse comprises:

selecting a shutter timing in which the predicted timing of the next SWIR pulse generated by the SAL target designator occurs wholly within the selected shutter timing.

18. The method of claim 12, wherein detecting a sequence of SWIR pulses comprises:

detecting SWIR energy over a field of view; and spatially summing the detected SWIR energy over the field of view.

19. The method of claim 12, wherein detecting a sequence of SWIR pulses comprises:

amplifying an output signal from a SWIR photo detector.

20. The method of claim 19, wherein detecting a sequence of SWIR pulses further comprises:

AC coupling the amplified output signal; and comparing the AC coupled signal with a predetermined threshold.

* * * * *